Oct. 15, 1946.    L. A. KILGORE    2,409,213
DAMPING FOR ELECTRICAL MACHINES
Filed April 14, 1944

WITNESSES:
E.A.McCloskey.

INVENTOR
Lee A. Kilgore.
BY C.B.Buchanan
ATTORNEY

Patented Oct. 15, 1946

2,409,213

UNITED STATES PATENT OFFICE 2,409,213

DAMPING FOR ELECTRICAL MACHINES

Lee A. Kilgore, Wilkinsburg, Pa., assignor to Westinghouse Electric Corporation, East Pittsburgh, Pa., a corporation of Pennsylvania Application April 14, 1944, Serial No. 531,039

3 Claims. (Cl. 172—274)

My invention relates to electrical damping means, connected to alternating-current dynamo-electric machines, for producing positive damping in the machine, over a predetermined range of speed of the machine or over a predetermined range of frequency of its electric currents. In this way, I provide a means for preventing the self-excited torsional vibration or oscillation which would otherwise occur, as a result of the negative damping inherent in the machine, or I may prevent oscillation as a result of governor or voltage-regulator action, in a machine which inherently has only weak positive damping. My invention is applicable both to synchronous motors and generators, and to wound-rotor parallel-connected induction motors having their secondaries paralleled, as well as their primaries. While at present the most important applications of my invention are in connection with polyphase machines, the invention is not limited thereto.

The general object of the invention is to provide a tuned, parallel-resonant circuit in series with some winding-circuit in which the frequency is substantially constant, which would normally be the primary winding-circuit of the machine, the tuned-circuit being tuned to a frequency slightly higher than the normal operating frequency, and including resistance in an amount suitable for materially altering the slope of the damping-torque curve of the machine.

Figure 1:
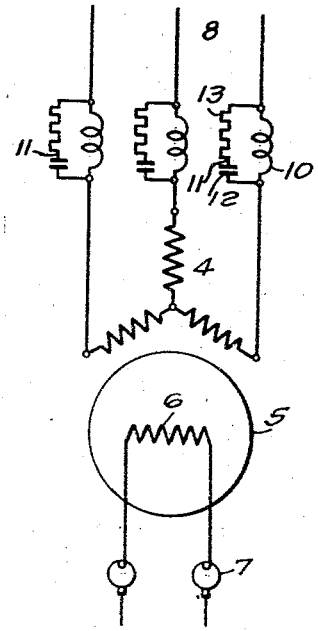
Figure 2:
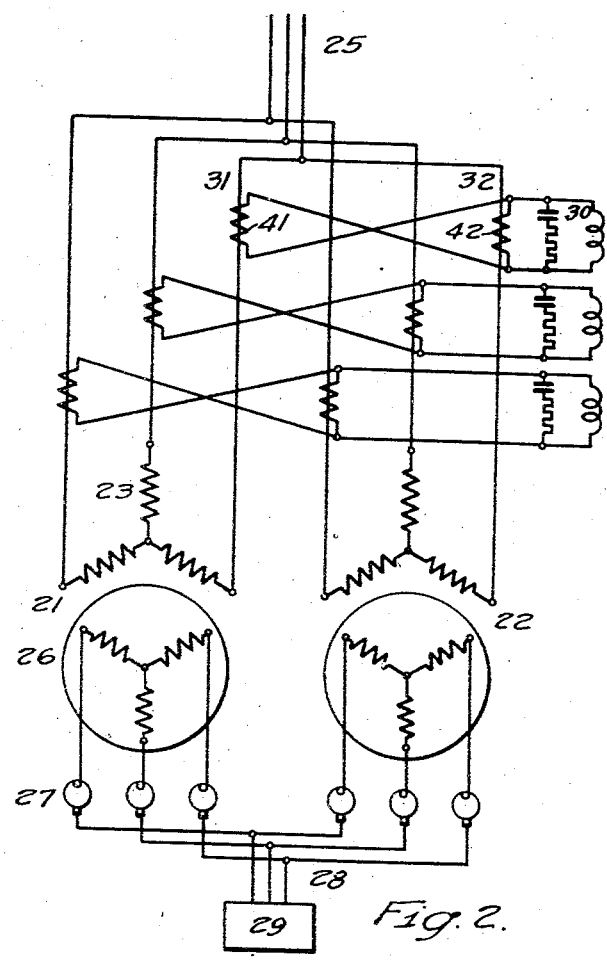

With the foregoing and other objects in view, my invention consists in the systems, combinations, apparatus, parts, and methods hereinafter described and claimed, and illustrated in the accompanying drawing, wherein Figure 1 is a diagrammatic view of a synchronous polyphase motor or generator with my invention applied thereto; Fig. 2 is a similar view of two wound-secondary polyphase induction motors, having both their primary windings and their secondary windings connected in parallel, with my electrical damping means connected thereto; and Fig. 3 is a curve-diagram which will be referred to in the explanation of the invention.

In Fig. 1, I have shown a polyphase synchronous machine, either a motor or a generator, having a stator member 4 carrying the polyphase primary windings, and a rotor member 5 carrying the direct-current exciting windings 6, which are energized through slip rings 7. Connected in series with each of the polyphase terminal leads 8 of the machine, or at least in series with some of said leads, are parallel-resonant tuned circuits, each comprising a plurality of parallel-connected reactance-branches 10 and 11, one of said branches, such as 10, having an inductive reactance, while the other branch, 11, has a capacitive reactance, as indicated by the capacitor 12. The aforesaid inductive and capacitive reactances are tuned to a frequency which is slightly higher than the constant line-frequency of the terminal lead 8 in which the tuned circuit is serially connected, and at least one of the branches 10 or 11 of said tuned circuit includes resistance, as indicated at 13, in an amount suitable for materially altering the slope of the damping-torque curve of the machine.

Figure 3:
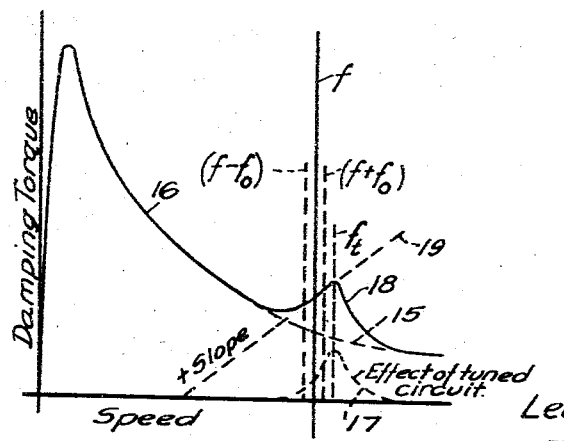

The effect of this serially-connected tuned circuit, having resistance, and tuned to a frequency slightly higher than the frequency of the normal currents traversing that terminal lead of the machine, will be understood by reference to Fig. 3, which shows the damping torque of the machine, plotted against the speed of the machine, or the frequency of the electrical currents traversing the primary winding of the machine, the scale of the abscissae being different, according to whether speed or frequency as indicated.

The torques of an alternating-current machine may be calculated by superimposing the currents and fluxes produced by the primary and secondary voltages, considering each separately. In doing this, the circuits must be assumed to be closed through any externally connected impedance or system. At constant speed, the secondary voltage or excitation of a synchronous machine produces a current which reacts with the synchronously rotating flux of the primary winding, to give the steady torque. If the rotor oscillates, at a small frequency $f_0$, and through a small angle, about the average position of the rotor, then currents will appear in the primary winding, in addition to the current of the line-frequency $f$, said additional currents being included in the frequency-range between $(f+f_0)$ and $(f-f_0)$. These additional induced currents produce components of damping-torque which may be regarded as resulting from the effect of the secondary oscillations, considered as if they were the primary of the machine, inducing these currents of the frequency-range between $(f+f_0)$ and $(f-f_0)$ in the primary winding, considering the latter as if it were the secondary winding of an induction motor operating at standstill.

If the resistance of the primary-winding circuit is constant, considering it now as if it were the secondary, then the torque, which will be a damping-torque, will have a negative slope, or what is known as negative damping, as shown by the curve 15—16 in Fig. 3. In this curve, the damping-torque just described is plotted against the speed of the machine. The normal operating-speed of the machine is that which corresponds to the line-frequency $f$, as indicated. At this speed, the fluxes of the primary and secondary are rotating synchronously, with no frequency-difference between them. If, now, torque-variations or speed-oscillations are produced in the machine, if these oscillations are of a low amplitude, as they certainly will be during the initial stages of their development, then the frequency-difference $f_0$ will also be low, not exceeding, say, 2 cycles, in a 60-cycle machine.

It will be observed, in Fig. 3, that the slope of the torque-curve 15—16, at the normal operating speed or frequency $f$, is a negative slope, producing negative damping, because a momentary increase in speed, as indicated at $(f+f_0)$ results in a smaller braking or damping torque, tending to feed energy into the oscillation and increase the amplitude of the momentary increase in speed.

The effect of my present invention is to introduce a variable resistance into one of the windings of the machine, preferably the primary winding because the frequency of the primary currents is substantially fixed, during normal, steady-state operation. The effect of the tuned circuit is indicated by the dotted curve 17 in Fig. 3, which, superimposed upon the constant-resistance damping-torque curves 15—16, produces a hump 18 in said curve, thus reversing the slope of the torque-curve 18—16, so that it has a positive slope 19, at the operating-frequency or speed $f$. This is brought about by reason of the fact that the currents circulating in the tuned circuit 10—11 (Fig. 1) are quite small, except when the frequency approaches the frequency to which the tuned circuit is tuned, at which time the magnitude of the circulating currents in the tuned circuit sharply increases, to a maximum at the frequency to which the circuit is tuned.

Hence, the resistance of the tuned circuit has practically no effect upon the resistance of the primary-winding circuit in which the tuned circuit is serially connected, until the frequency of the primary-winding circuit approaches the frequency to which the tuned circuit is connected, and as this tuned-circuit frequently is approached more and more closely, the energy-losses in the resistance of the tuned circuit increase steadily, thus producing the effect of an increasing resistance, in the primary circuit, as the frequency of the primary current increases toward the frequency to which the tuned-circuit is tuned. In Fig. 3, the tuned-circuit frequency is indicated at $f_t$, and the relation between resistance and reactance, in the tuned circuit, is such as to cause the resonance effect of the tuned circuit to be spread out over a sufficiently broad base so as to extend to frequencies lower than the minimum expectable oscillation-frequency $(f-f_0)$ in the machine whose oscillations are to be damped. For example, on a 60-cycle system, the resonant circuit might be tuned to a frequency $f_t$ of, say, 63 cycles; or any other suitable value may be chosen as the exigencies of any particular case may require.

Fig. 2 shows the application of my invention to the case of two polyphase induction motors 21 and 22, having primary stator members 23 which are energized in parallel from a common supply-line 25, and having wound-rotor secondary members 26, having secondary-terminals including slip rings 27, the corresponding secondary phases of the two machines being paralleled together to a common secondary polyphase terminal 28 which is connected to a secondary energy-translating means 29 which may be a resistance or a motor-generator set, or any other means for absorbing energy from, or feeding energy to, the secondary windings 26 of the two machines 21 and 22.

In Fig. 2, the tuned circuits are shown at 30, but instead of being connected directly in the primary leads 31 and 32 of the respective motors 21 and 22, they are connected through differentially connected current-transformers 41 and 42, connected in the corresponding phases of the primary windings of the respective motors. In this manner, no energy is absorbed in the damping circuit 30 when the currents to the two motors 21 and 22 are balanced, as they normally would be when the motors are connected to a common load, or shaft. However, due to the inherent negative slope of the damping-torque characteristic of the motors, there would be a tendency for the motors to exchange energy between each other, resulting in surges of current, in which case the differentially connected current-transformers 41 and 42 feed energy into the tuned circuit 30, which is tuned to a frequency slightly higher than the normal line-frequency, thus introducing a variable-resistance effect which increases as the oscillations become greater, thus introducing the positive damping effect which is indicated at 19 in Fig. 3.

I claim as my invention:

1. An alternating-current dynamo-electric machine inherently subject to negative damping tending to cause self-excited oscillations through a narrow frequency-range above and below an average operating-frequency of a winding of the machine, in combination with electrical damping-means comprising a damped tuned circuit, and terminal connections for serially connecting said tuned circuit to said winding, said tuned circuit comprising a plurality of parallel-connected reactance-branches, one of said branches having an inductive reactance, another of said branches having a capacitive reactance, said inductive and capacitive reactances being tuned to a frequency equal to said average operating-frequency, plus said narrow frequency-range above said average operating-frequency, plus a small additional increment of frequency, and at least one of said branches including resistance in an amount suitable for materially altering the slope of the damping-torque curve of the machine so as to produce positive damping within said narrow frequency-range above and below said average operating-frequency.

2. Electrical damping-means for two substantially constant-frequency alternating-current dynamo-electric machines having parallel-connected primary leads, said damping-means comprising differentially connected current-transformers in corresponding primary leads of the two machines, and a damped tuned circuit energized from said differentially connected current-transformers, said tuned circuit comprising a plurality of parallel-connected reactance-branches, one of said branches having an inductive reactance, another of said branches having a capacitive reactance, said inductive and capacitive reactances being tuned to a frequency slightly higher than the constant line-frequency of the primary leads, and at least one of said branches including resistance in an amount suitable for materially altering the slope of the damping-torque curve of the machine so as to produce positive damping within a narrow frequency-range above and below said constant line-frequency of the primary leads.

3. Two parallel-connected, wound-secondary induction-motors as defined in claim 2, characterized by a common polyphase secondary energy-translating device, and connections whereby the secondary windings of the two motors are connected in parallel relation to each other and are both connected to said common energy-exchanging device.

LEE A. KILGORE.